July 29, 1958 C. E. MORLEY 2,845,000
REAR VIEW MIRROR
Filed Sept. 14, 1955
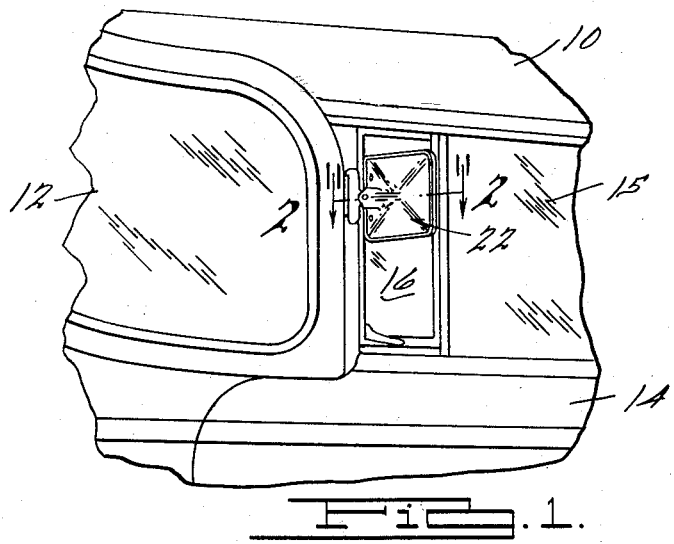
Fig. 1.
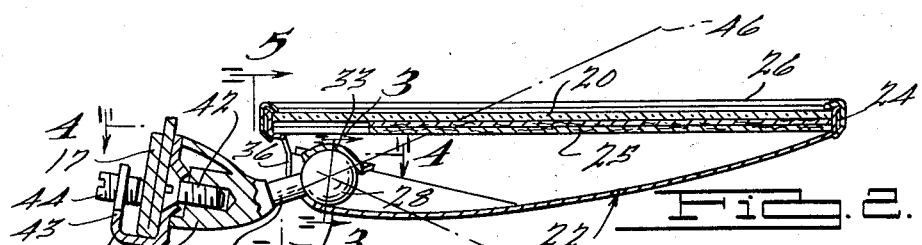
Fig. 2.
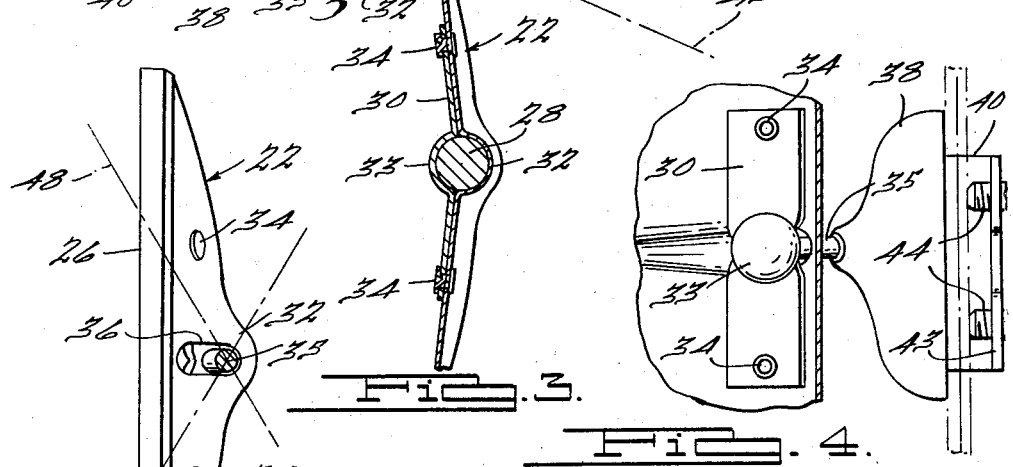
Fig. 3.
Fig. 4.
Fig. 5.
INVENTOR.
Charles E. Morley.
BY
Harness, Dickey & Pierce
ATTORNEYS

United States Patent Office 2,845,000
Patented July 29, 1958

2,845,000

REAR VIEW MIRROR

Charles E. Morley, Grosse Pointe, Mich.

Application September 14, 1955, Serial No. 534,273

2 Claims. (Cl. 88—98)

This invention relates to the construction of rear vision mirrors of the so-called "side-view" type intended for installation upon the side of and adjacent to the passenger compartment of a motor vehicle, and is particularly concerned with the provision of an improved adjustable mirror supporting structure which is highly ornamental in appearance, effective in operation, inexpensive to construct and easy to install.

An important object of the invention is to incorporate in such a mirror an improved and simplified supporting structure.

Other objects and advantages of the invention will become apparent upon consideration of the present disclosure in its entirety.

In the drawing:

Figure 1 is a fragmentary perspective view of a portion of an automobile equipped with a rear mirror incorporating the present invention;

Fig. 2 is a horizontal sectional plan view on a larger scale, taken substantially as indicated by the line and arrows 2—2 of Fig. 1; and Figs. 3, 4 and 5 are sectional details taken substantially on the lines 3—3, 4—4 and 5—5 respectively of Fig. 2, and looking in the direction of the arrows.

Referring now to the drawing, reference character 10 designates generally a sedan-type motor vehicle body. The windshield is designated 12, and the left front door is designated 14. The vehicle is shown as of the type wherein the edge of the door, in the area directly behind the windshield, is substantially vertical, and my improved mirror is designed to be fastened to the front flange or lip of the door in this region and to be visible by the driver through the window 15 and ventilator pane 16. The mirror construction is of such symmetrical design that it may be similarly affixed to the right front door, as will be apparent.

The reflecting mirror 20 which may be of any suitable or conventional type is illustrated as substantially square, but with rounded corners, and is fitted in a sheet metal backing and supporting shell generally designated 22. The outline of the shell of course conforms to that of the glass, and the shell is equipped with a substantially straight-walled flange 24 bounding its open face and of such depth as to accommodate therewithin, in addition to the glass 20, one or more filling and cushioning pads as 25 of asphalt-impregnated cardboard or the like, the glass 20 and fillers 25 bridging the dished and substantially closed rear portion of the shell and filling the vertical height of the flange 24, and being retained therein by a bezel ring 26 which is rolled or otherwise flanged over upon both edges to embrace the glass and the rear of the shell 22, and which is preferably rolled tightly enough to force the glass and fillers against the bottom of the shell in the peripheral area of the latter. It will be appreciated that the details of construction and manner of securing of the glass, fillers, bezel ring and coacting peripheral portions of the shell 22 are shown by way of example and are subject to variation without departing from the invention.

The shell is designed to be supported in a position such that the top and bottom edges extend outwardly substantially horizontally from the vehicle when the mirror is installed. In the area which lies closest to the vehicle, the shell is deep enough to accommodate therewithin a ball portion 28 and a coacting socketed friction plate 30 which partially embraces and bears against the ball. The plate 30, which may be formed of flat strip spring steel, bridges an outwardly embossed area 32 of the shell which also defines a part socket and embraces the other side of the ball.

The retaining strip 30 is suitably secured near its ends, as by means of rivets 34, to the interior of the shell. Rigidly secured to the ball 28 is a radially extending stem 35 which projects out of the shell through a slot 36. The slot 36 is formed in the edge wall of the shell which lies closest to the vehicle body when the mirror is installed, and the slot extends in a direction perpendicular to the glass. The other end of the stem 35 is rigidly secured to a base or pad portion 38 which is of enlarged cross section as it extends away from the stem and toward its vehicle-engaging face, the contouring and dimensions being of course subject to variation and being such as to provide a firm support and conform generally to the surface of the door flange or lip as 17 to which the mirror is to be attached. A sheet metal clamp 40 contoured to partially interfit with and to be secured to the base, and to embrace the door flange, is secured to the base by a screw 42 in a manner which will be recognized as conventional. One or more holding set screws as 44 may be provided near the free edge of the inner flange 43 of the clamp to secure the assembly to the door.

It will be observed that the stem 35 is rigidly supported in a substantially horizontally outwardly extending position when the mirror is installed, and that the stem and the slot 36 are long enough to permit the mirror to be moved toward the front and rear of the vehicle throughout a substantial angle, about a vertical axis which extends through the center of the ball. This permits the mirror to be moved, for example, to the positions indicated by the dotted lines 45, 46. The mirror may also be turned about a horizontal axis extending through the center of the ball and which is coaxial with the stem 35, to tilt the mirror upwardly and downwardly, as indicated, for example, by the dotted lines 48, 50 in Fig. 5. Inasmuch as the width of the slot 36 in a vertical direction is not substantially greater than the diameter of stem 35, however, the stem and slot prevent the mirror from being tilted to any substantial extent about a horizontal axis which extends perpendicular to the stem 35, that is, about an axis longitudinal with respect to the vehicle. Thus the support prevents tilting the mirror in such manner that the top and bottom edges are in any position other than substantially horizontal, and the mirror, despite the fact that it is universally adjustable and is non-concentric with respect to its ball joint support, is always maintained in an orientation which presents the most attractive appearance, that is, with the top and bottom edges horizontal. The depth of the shell may be graduated, as brought out in Fig. 2, so that it tapers to reduced thickness in a direction away from the vehicle body, and the outline and configuration may of course be altered in many respects. My improved mounting not only insures that the mirror will be maintained in a proper position which provides the best appearance, but it will be observed that there are no moving parts whatever except for the complete mirror head itself. The structure is accordingly more rigid and more resistant to vibration and accidental displacement, as well as simpler and less expensive, than mountings which incorporate moving parts or which permit the mirror head to be moved in a vertical plane.

While it will be apparent that the preferred embodiment of the invention herein described is well calculated to fulfill the objects and advantages first above stated, it will be appreciated that the invention is susceptible to variation, modification and change without departing from the fair meaning and proper scope of the appended claims.

I claim:

1. In a rear view mirror construction having a supporting base adapted to be secured to a vehicle, a stem rigidly secured to and projecting from the base, and a ball rigidly carried by the stem, a mirror head mounted for angular movement with respect to the base about the first and second of three perpendicular axes, the third axis being perpendicular both to the stem and to the plane of the mirror, whereby its mirror reflecting surface is movable throughout all positions which affect the reflected angle of vision, said mirror head comprising integrated shell and mirror portions, such shell and mirror portions being spaced from each other, said shell portion having a straight slot formed in an edge portion thereof, said slot being located so that a portion thereof extends away from the mirror in a direction substantially perpendicular to the mirror surface, means mounting said mirror head nonconcentrically on said ball, said ball being accommodated within such space between the said shell and mirror portions with the stem projecting outwardly from, and through said slot in the shell in a direction generally parallel to the plane of the mirror, the base being outside and spaced from the shell, friction means within and secured to the shell and coacting with the ball and shell to define a mirror-supporting socket portion rockable on the ball and to yieldably oppose such rocking and thereby yieldably oppose angular movement of the mirror head with respect to the ball and stem, said mirror head being angularly movable in the plane of the slot about a first axis which extends through the center of the ball perpendicularly to the stem, said mirror head being also angularly movable about a second axis which extends through the center of the ball parallel to said stem, the opposite sides of said slot being parallel to one another and fitted closely with respect to opposite sides of the stem at positions spaced from the center of the ball to prevent angular movement of said mirror and shell portions about a third axis which extends through the center of the ball perpendicular to said first and second axes whereby eccentric swivel movement of said mirror head in the plane of the mirror about its nonconcentric mounting is restrained.

2. In a rear view mirror construction having a supporting base adapted to be secured to a vehicle, a stem rigidly secured to and projecting from the base, and a ball rigidly carried by the stem, a mirror head mounted for angular movement with respect to the base and to a vehicle to which the base is affixed about the first and second of three perpendicular axes, the third axis being perpendicular both to the stem and to the plane of the mirror whereby its mirror reflecting surface is movable throughout all positions which affect the reflected angle of vision, said mirror head comprising a sheet metal mirror shell having a side wall and a back wall and an inwardly opening concavo-convex part-socket portion formed in the back wall adjacent the side wall, said shell having a slot in the side wall adjacent the part-socket portion, said slot having a portion thereof extending substantially perpendicular to the back wall, a resilient sheet metal combined spring and part-socket portion secured to and within the shell, said ball being frictionally held by and between said part-socket portions so that said stem extends through the slot, said mirror head being angularly movable in the plane of the slot about a first axis which extends through the center of the ball perpendicularly to the stem, said mirror head being also angularly movable about a second axis which extends through the center of the ball parallel to said stem, the opposite sides of said slot being parallel to one another and fitted closely with respect to opposite sides of the stem at positions spaced from the center of the ball to prevent angular movement of said mirror and shell portions about a third axis which extends through the center of the ball perpendicular to said first and second axes whereby eccentric swivel movement of said mirror head in the plane of the mirror about its nonconcentric mounting is restrained.

References Cited in the file of this patent

UNITED STATES PATENTS

| | | |
|---|---|---|
| 2,256,763 | Reed | Sept. 23, 1941 |
| 2,333,671 | Peters et al. | Nov. 9, 1943 |
| 2,469,207 | Roedding | May 3, 1949 |